R. SIEGFRIED.
VEHICLE WHEEL.
APPLICATION FILED AUG. 20, 1906.
1,118,158.
Patented Nov. 24, 1914.
3 SHEETS—SHEET 1.
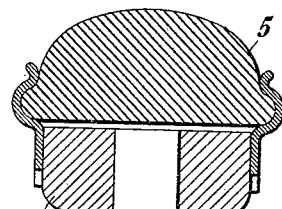
Fig. 1.
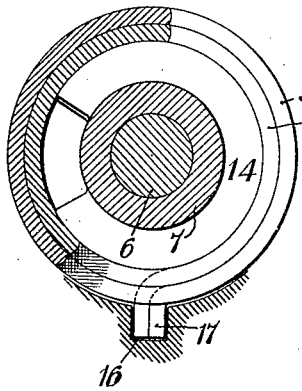
Fig. 2.
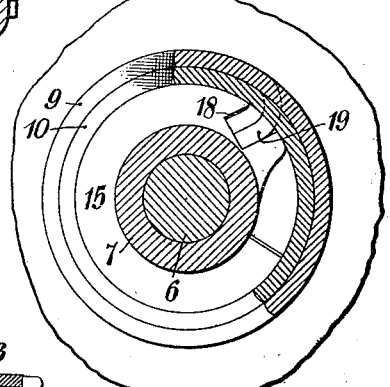
Fig. 3.
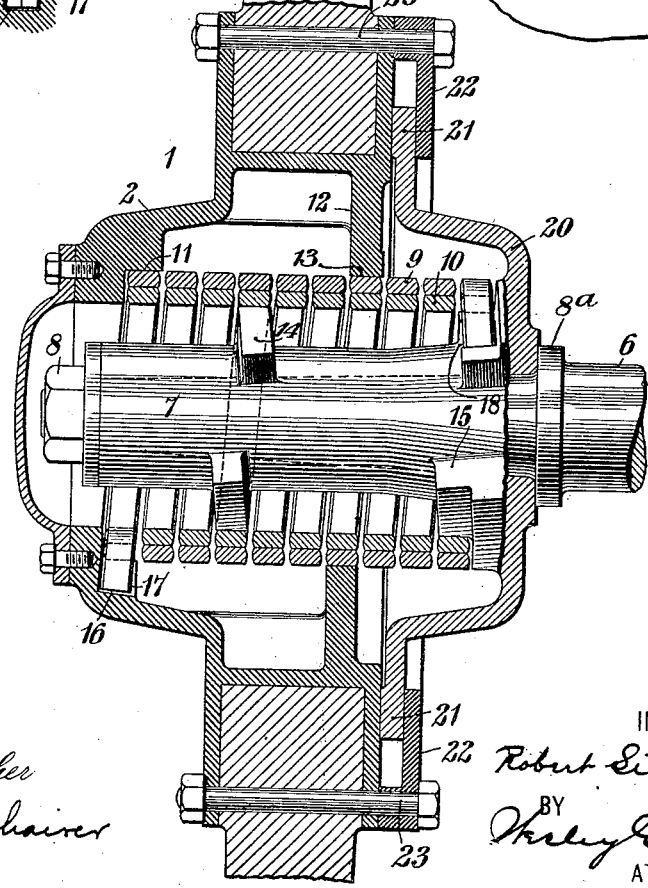
WITNESSES:
C. L. Belcher
Otto S. Schairer
INVENTOR
Robert Siegfried
BY
ATTORNEY

R. SIEGFRIED.
VEHICLE WHEEL.
APPLICATION FILED AUG. 20, 1906.

1,118,158.

Patented Nov. 24, 1914.
3 SHEETS—SHEET 3.

WITNESSES:
C. L. Belcher
Otto S. Schairer

INVENTOR
Robert Siegfried
BY
ATTORNEY

UNITED STATES PATENT OFFICE.

ROBERT SIEGFRIED, OF PITTSBURGH, PENNSYLVANIA.

VEHICLE-WHEEL.

1,118,158.   Specification of Letters Patent.   Patented Nov. 24, 1914.

Application filed August 20, 1906. Serial No. 331,390.

*To all whom it may concern:*

Be it known that I, ROBERT SIEGFRIED, a citizen of the United States, and a resident of Pittsburgh, in the county of Allegheny and State of Pennsylvania, have invented a new and useful Improvement in Vehicle-Wheels, of which the following is a specification.

My invention relates to vehicle wheels and it has for its object to provide a cushioning and driving means between some portion of the wheel and a coöperating vehicle member which shall be simple and compact in construction and possessed of certain functional characteristics which render it more durable and effective in service than devices heretofore proposed or employed for like purposes.

Figure 4:
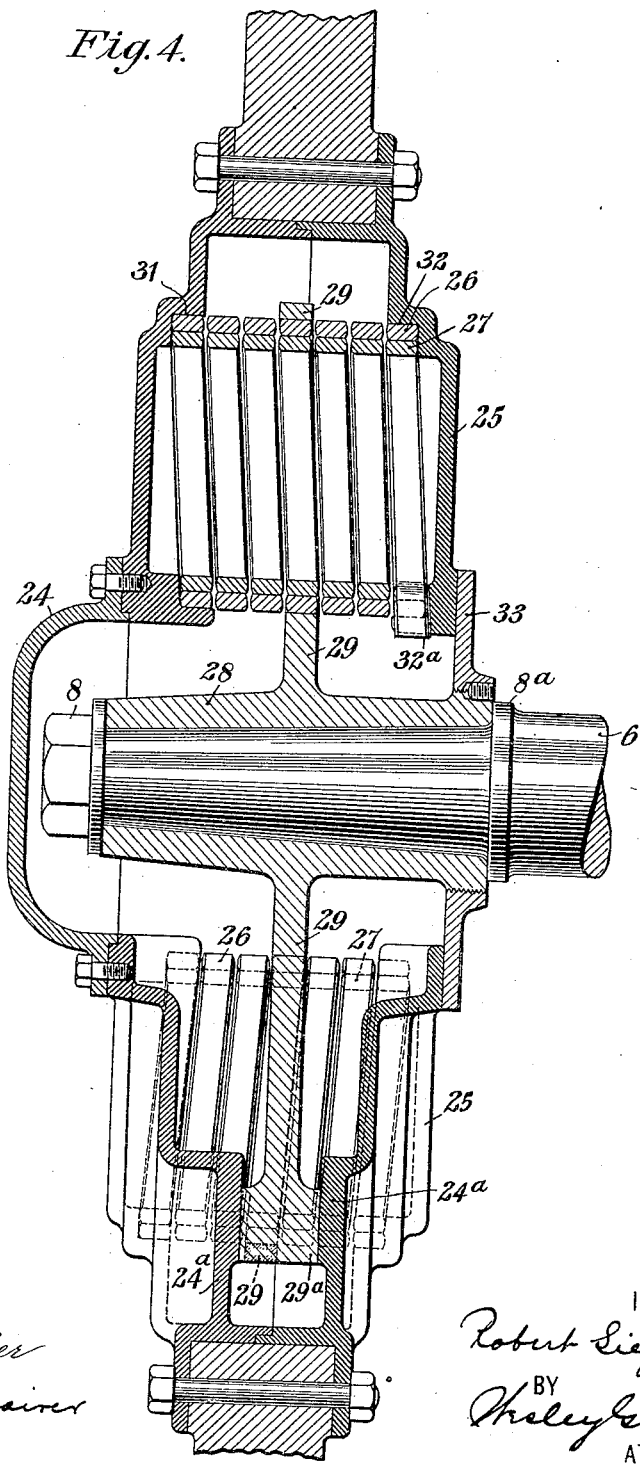
Figure 5:
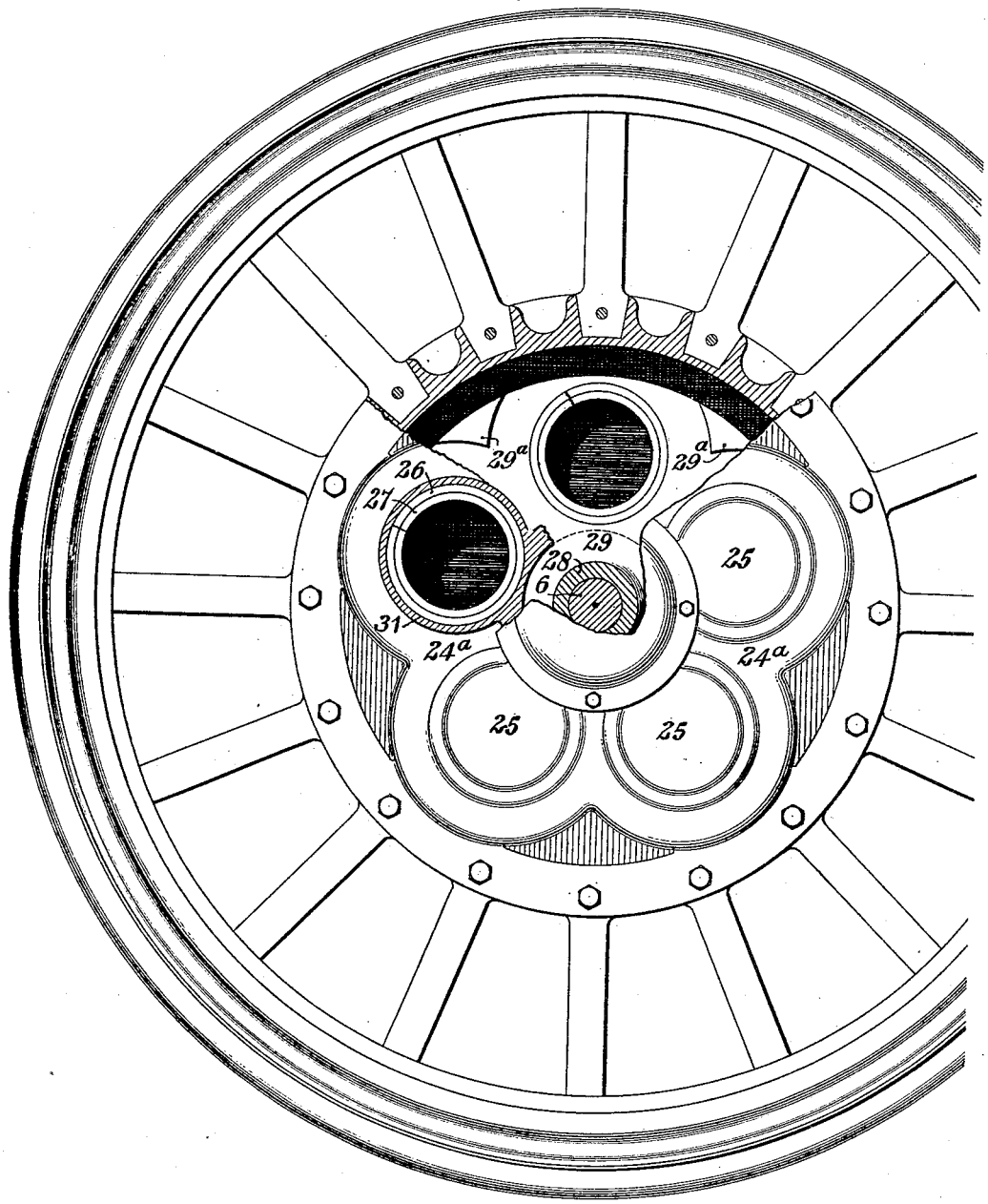

In the accompanying drawings, Figure 1 is a sectional view of a portion of a vehicle wheel equipped with my invention, and Figs. 2 and 3 are transverse sectional views of a portion of the mechanism shown in Fig. 1. Fig. 4 is a sectional view of a portion of a wheel embodying a modification of my invention, and Fig. 5 is a view, partially in elevation and partially in section, of the wheel shown in Fig. 4.

Referring first to Figs. 1, 2 and 3, the wheel 1 comprises a central box or chamber 2, spokes 3 radiating therefrom, a felly 4 and a suitable tire 5. The vehicle axle 6 projects into the box or chamber 2 and is provided with a sleeve 7 within the chamber 2, which is rotatably fitted thereon, and is held in position against longitudinal movement by means of a nut 8 and a flange 8ª. Surrounding the sleeve 7, within the chamber 2, is a compound helical spring comprising two single springs 9 and 10 which are of the same form and dimensions, except that the inner diameter of the spring 9 is the same as the outer diameter of the spring 10, so that the two are concentrically disposed in contact with each other. By providing the two springs, constructed as shown, a device of great strength is secured and, at the same time, there is sufficient movement of the parts with reference to each other to secure a degree of resiliency which would not be possible if a single spring of equal strength were employed. My invention is not limited, however, either to a compound spring comprising two elements only or to a compound spring.

Since the spring is disposed concentrically with the sleeve 7, a cushioning effect is secured by lateral movement of the spring convolutions, and, in order that the parts may be properly and adequately supported, I provide the chamber 2 with one or more curved projections to engage certain portions of the outer sides of the springs 9. As shown in Fig. 1, a curved seat 11, of helical conformation, near one end of the chamber, and an intermediate rib 12, having a like curved seat 13 for another turn of the spring, are provided.

In order that the springs may have suitable inside supports, the sleeve 7 is provided with one or more curved ribs which engage the inner faces of certain of the turns of the spring 10. As shown in the drawing, a rib 14, of helical contour and extending for approximately 300°, is located midway between the seats 11 and 13 and has the same helical pitch as the springs. Adjacent to the one end of the chamber 2 is located a rib 15, similar to the rib 14, the outer surface of which engages the inner surface of the end turn of the spring. The ribs 14 and 15 are so located with reference to the seats 11 and 13 that an equal number of convolutions of the springs is located between each two adjacent inner and outer bearing portions, the result being that substantially the same resistance to lateral strains is exerted by all portions of the spring.

Instead of making the inner and outer bearing seats for the spring of substantially 300°, they may be variously modified, as regards structure and arrangement, without departing from the invention.

In order to effect a locking engagement between the springs and the chamber 2 and sleeve 7, I provide the former with a recess 16 adjacent to its outer end and bend the corresponding ends of the springs in a substantially radial position to fit within the recess, as indicated at 17. The rib 15 is also provided with a recess 18 and the corresponding ends of the springs are bent at a suitable angle to fit within the recess, as indicated at 19.

When two or more springs are employed it may be found desirable to provide a corresponding number of equally spaced recesses similar to that at 16 for the reception of the ends of the springs, all tendency to lateral displacement of the ends of the springs that would otherwise result from the application of torsional forces thereto being obviated in this manner. For instance, when two springs are employed the recesses for the reception of the respective ends thereof should be located diametrically opposite, and if three springs are employed they should be spaced 120° apart.

In order to provide for lateral play for the axle 6 incident to the cushioning effect which my invention is designed to insure, and to maintain a perpendicular relation between the axle and the plane of the wheel, I provide a cap 20 for the inner end of the chamber 2, the outer edge 21 of which fits against one side of the wheel, so as to slide free thereon, and is surrounded by an external ring 22, which is fastened to the wheel by means of bolts 23.

Referring now to Figs. 4 and 5, the wheel chamber 24, into the central portion of which the axle 6 projects, is provided with a plurality of cylindrical auxiliary chambers 25, five of such auxiliary chambers being shown in the drawing, and in each of these auxiliary chambers is located a compound helical spring comprising two single springs 26 and 27 which are, or may be, in all essential respects, like the springs 9 and 10 shown in Figs. 1, 2 and 3. The sleeve 28, which is rotatably mounted upon the axle 6, is held against longitudinal displacement by means of a nut 8 and a flange 8ª, and is provided, substantially midway between its ends, with a disk flange 29 having circular openings to receive the springs, the flange being of such shape that the seats provided by the openings will have substantially the same helical pitch as the springs. The ends of the springs are supported by helically curved seats 31 and 32 at the ends of the auxiliary chambers. Either or both of the corresponding ends of the springs may be bent at suitable angles and seated in recesses to lock the springs in position, as indicated at 32ª, or they may be otherwise locked in position, as may be found desirable. In order to assist in maintaining the parts in proper operative relation, I provide the disk flange 29 with side bosses 29ª adjacent to its periphery and between the openings for the springs, the bosses being of such thickness as to fit closely between the portions 24ª of the walls of the chamber 24. The structure shown in these figures may also be so modified as to provide internal as well as external bearing seats for the springs, substantially as indicated in Figs. 2 and 3, if desired, and modifications may be made as regards the number of either single or compound springs.

The yielding connection between the axle and the wheel which permits of the cushioning action of the springs is insured by providing an end cap or plate 33 which fits against the inner end of the chamber 24.

It will be feasible and may be desirable to locate the springs and spring chambers between the outer ends of the spokes and the wheel tire instead of adjacent to the axle, in order to enable manufacturers to utilize the invention in connection with wheels such as have been heretofore in use by reducing the lengths of the spokes and substituting, for the usual felly and tire, an annular structure comprising a solid tire, a set of springs and a supporting frame for the said parts.

In each of the modifications thus far described, the motor for propelling the vehicle may be operatively connected to the driving wheels by means of any suitable gearing one member of which is mounted upon the end cap 20 in the one case and upon the end plate 33 in the other case, so that the springs may serve as yielding driving connection as well as a cushioning means between the axle sleeve and the wheel proper.

I claim as my invention:

1. The combination with a wheel having a chamber provided with a plurality of helically curved seats, of an approximately cylindrical vehicle member provided with one or more helically curved seats within said chamber, and a compound helical spring that engages said seats and is locked against circumferential movement.

2. The combination with a wheel having a chamber provided with helically curved seats, of a driving member having a part located in said chamber and provided with helically curved seats, and a compound helical spring located in said chamber to engage said helically curved seats, and provided with means to prevent displacement thereof.

3. The combination with a wheel having a chamber provided with helically curved seats, of a driving member having a part located in said chamber and provided with helically curved seats, a helical spring located in said chamber to engage said seats, means for locking said spring against displacement on the seats and means for maintaining a substantially perpendicular relation between the axle and the plane of the wheel.

4. The combination with a wheel having a chamber provided with helically curved seats, of a driving member having a part located in said chamber and provided with helically curved seats, a helical spring located in said chamber to engage said seats, means for locking said spring against displacement on the seats and guides for maintaining a substantially perpendicular relation between the axle and the plane of the wheel but permitting relative movement in said plane.

5. The combination with a wheel having a chamber provided with one or more internal curved seats, of an approximately cylindrical vehicle member that projects into said chamber and is provided with one or more external curved seats, and a helical spring that engages said seats and the respective ends of which make self-locking engagement with one end of said chamber and with said member at the other end of the chamber.

6. The combination with a wheel having a chamber provided with one or more internal curved seats, of an approximately cylindrical vehicle member that projects into said chamber and is provided with one or more external curved seats and a compound helical spring that engages said seats and the respective ends of which make self-locking engagement with said chamber and with said member.

In testimony whereof, I have hereunto subscribed my name this 17th day of August, 1906.

ROBERT SIEGFRIED.

Witnesses:
OTTO S. SCHAIRER,
BIRNEY HINES.

Copies of this patent may be obtained for five cents each, by addressing the "Commissioner of Patents, Washington, D. C."